(12) United States Patent
Chung et al.

(10) Patent No.: US 6,660,070 B2
(45) Date of Patent: Dec. 9, 2003

(54) AIR PURIFIER

(75) Inventors: Chi Cheung Chung, Hong Kong (HK); Stephen Wai-Kin Chan, Hong Kong (HK); Wing-Chung Li, Hong Kong (HK)

(73) Assignee: Simatelex Manufactory Co., Ltd., Hong Kong (HK)

( * ) Notice: Subject to any disclaimer, the term of this patent is extended or adjusted under 35 U.S.C. 154(b) by 64 days.

(21) Appl. No.: 09/998,146

(22) Filed: Nov. 30, 2001

(65) Prior Publication Data

US 2002/0078830 A1 Jun. 27, 2002

Related U.S. Application Data

(63) Continuation-in-part of application No. 09/305,251, filed on May 4, 1999, now abandoned.

(51) Int. Cl.[7] .................................................. B01D 46/46
(52) U.S. Cl. .............................. 96/424; 96/397; 96/417; 96/422; 95/25; 95/26; 55/385.2; 55/472; 55/473; 55/DIG. 34
(58) Field of Search ........................ 55/467, 472, 473, 55/385.2, DIG. 34; 95/25, 26; 96/417, 424, 397, 421, 422

(56) References Cited

U.S. PATENT DOCUMENTS

| | | | |
|---|---|---|---|
| 4,786,295 A | * | 11/1988 | Newman et al. ............. 55/471 |
| 4,792,345 A | | 12/1988 | Abe et al. |
| 5,334,248 A | | 8/1994 | Kwak |
| 5,735,918 A | | 4/1998 | Barradas |
| 5,914,453 A | | 6/1999 | James et al. |
| 5,925,172 A | * | 7/1999 | Rick et al. ..................... 96/424 |
| 5,942,017 A | | 8/1999 | Van Winkle, Sr. |
| 6,036,757 A | * | 3/2000 | Gatchell et al. ............... 96/424 |

FOREIGN PATENT DOCUMENTS

| | | |
|---|---|---|
| EP | 0151735 | 8/1985 |
| JP | 60-94159 | 5/1985 |
| JP | 2-25646 | 1/1990 |
| JP | 6-91124 | 4/1994 |
| JP | 8-318117 | 12/1996 |

* cited by examiner

Primary Examiner—Blaine Copenheaver
Assistant Examiner—Minh-Chan T. Pham
(74) Attorney, Agent, or Firm—Jackson Walker L.L.P.

(57) ABSTRACT

An air purifier includes a cabinet, an electrically driven fan, a replaceable filter element, and an air quality sensor. A display provides a visual indication of the air quality condition. A microprocessor is programmed to control the speed of the fan automatically according to the air quality condition. The microprocessor also computes when the filter element must be changed by totalling the time of operation and its speed (which equals air quality) so that for example the filter element will be changed more often (used for less aggregate time) when the air purifier is operated in a poor quality environment.

5 Claims, 7 Drawing Sheets

AIR PURIFIER

This is a continuation-in-part of U.S. patent application Ser. No. 09/305,251, filed May 4, 1999, now abandoned.

BACKGROUND OF THE INVENTION

1. Field of the Invention

The invention relates to air purifiers.

2. Description of Prior Art

Air purifiers each comprise a cabinet, incorporating an electrically driven fan and a filter, arranged normally to be free-standing or mounted to a wall of a room to circulating air in the room through the filter. The fan is switched manually ON and OFF, or may be timed to remain ON for a fixed time period before turning OFF automatically. The filter is exchangeable and it is known to arrange a filter replacement indicator, to warn the user that the filter may be dirty, based on a total time the fan has been operating with a particular filter. This may not be a practically efficient way of providing such indication and in any event the present air purifiers provide no indication of air quality in the room.

SUMMARY OF THE INVENTION

It is an object of the invention to overcome or at least reduce these problems.

According to the invention there is provided an air purifier comprising a cabinet, a replaceable filter mounted in the cabinet, an electrically driven fan arranged to draw air through the filter, an air quality sensor arranged to detect particles in the air, and a programmed microcomputer arranged to alter the speed of the fan in accordance with signals generated by the air quality sensor in a manner such that the fan speed is increased when the air quality condition is poor or deteriorates, the fan speed is decreased when the air quality condition is good or improves, and the fan is automatically turned off whenever the number of particles per unit volume of air is in the range 0 to 2200. Preferably, a unit volume is one cubic foot.

Preferably, the air quality sensor is arranged to detect particles equal to or larger than one micrometer in size, and the microcomputer is arranged to turn off the fan automatically whenever the number of said particles per cubic foot of air is in the range 0 to 2200.

The air purifier may also included a visual display arranged to provide a visual display indicative of air quality, and the programmed microcomputer is responsive to signals from the air quality sensor at predetermined intervals to cause the visual display to indicate air quality, and to alter the speed of the fan in accordance with the indicated air quality. The period of the predetermined interval is preselectable.

The air purifier may further include a visual display arranged to provide a visual indication when the filter should be replaced, the programmed microcomputer arranged to periodically alter the speed of the fan in accordance with signals generated by the air quality sensor and to cause the visual display to indicate that the filter should be replaced, said indication being caused when a fan total running time value equals or exceeds a predetermined value, the fan total running time value being periodically incremented according to the formula $T_{n+1} = T_n + a \times t$, wherein $T_n$ is the fan total running time, $a$ is a fan speed factor and $t$ is the fan operating time at speed factor $a$. The fan total running time value is incremented each time the microcomputer changes the fan speed.

BRIEF DESCRIPTION OF THE DRAWING

An air purifier according to the invention will now be described by way of example with reference to the accompanying drawings in which.

DESCRIPTION OF THE PREFERRED EMBODIMENTS

Figure 1:
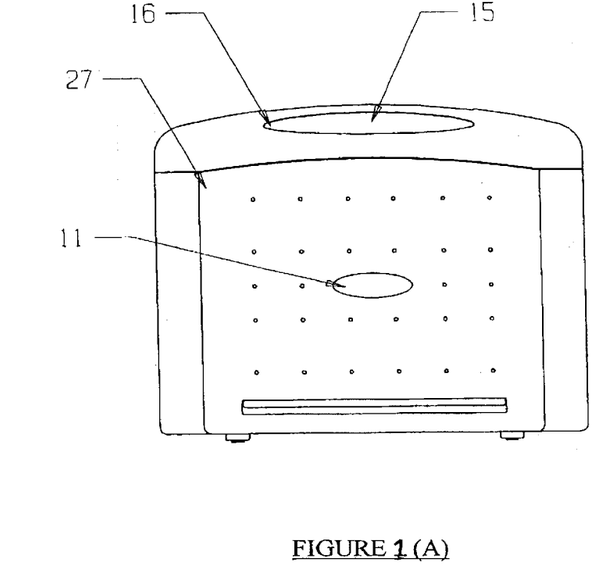
FIG. 1(A) is a front side view of the air purifier.
FIG. 1(B) is a side view of the air purifier.

Referring to the drawings, in FIGS. 1(A) and 1(B), the purifier has a cabinet 10, and an electric fan 11 and a replaceable filter element 12 mounted inside the cabinet. An air quality sensor 13 and a microcomputer 14 are also mounted to the cabinet 10. A display unit 15 provides a visual indication of the air quality condition at any time based on signals generated by the sensor 13. Mode and timer indications show the air purifier's instant operation mode and an auto-shut OFF condition. A filter replacement indicator 16 lights up when the filter should be changed.

Figure 2:
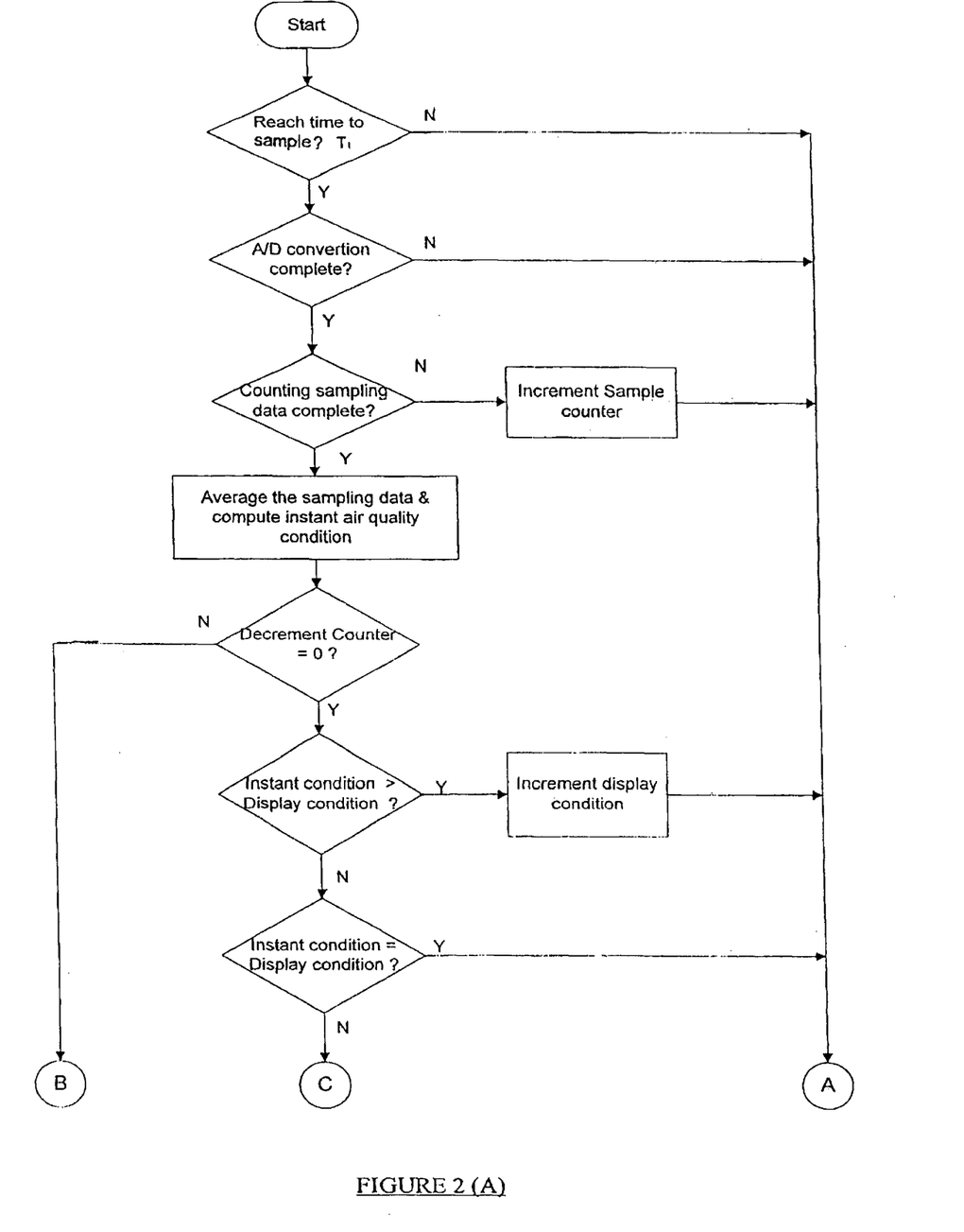
FIGS. 2(A), 2(B) and 2(C) comprise a flow chart of air quality condition display and system control of the air purifier.

In FIGS. 2(A), 2(B) and 2(C), the flow chart represents visual indication of air quality condition and system control of the air purifier. This is implemented by the microcomputer. The air purifier is arranged to check air quality condition in the room at predetermined time intervals. When the checking interval T1 (the interval of data taking by the sensor 13) is completed, an analogue signal from the air quality sensor 13 is read by the microcomputer 14, and the signal is converted into digital data. The microcomputer 14 averages the data, and computes an instant air quality condition. Comparing the instant air quality condition with the displayed air quality condition, a new display air quality condition will show at the visual indicator on the panel if different from the previous indicated condition. Two selectable fixed predetermined time intervals (T2 or T3) of counting time are programmed in the microcomputer 14 that can be preset by a using jump wire in the control circuit. A longer counting interval T2 allows the air purifier, in poor air quality conditions, to operate for longer to make sure the air in a room is thoroughly cleaned and avoids the fan speed being frequently altered. A shorter counting interval T3 allows the air purifier to be more sensitive to rapid changes in air quality in the room by more frequently changing the fan speed. It will be noted that in an automatic speed mode, the electrical fan 11 speed is always altered in accordance with changes of the air quality condition in the room.

Figure 3:
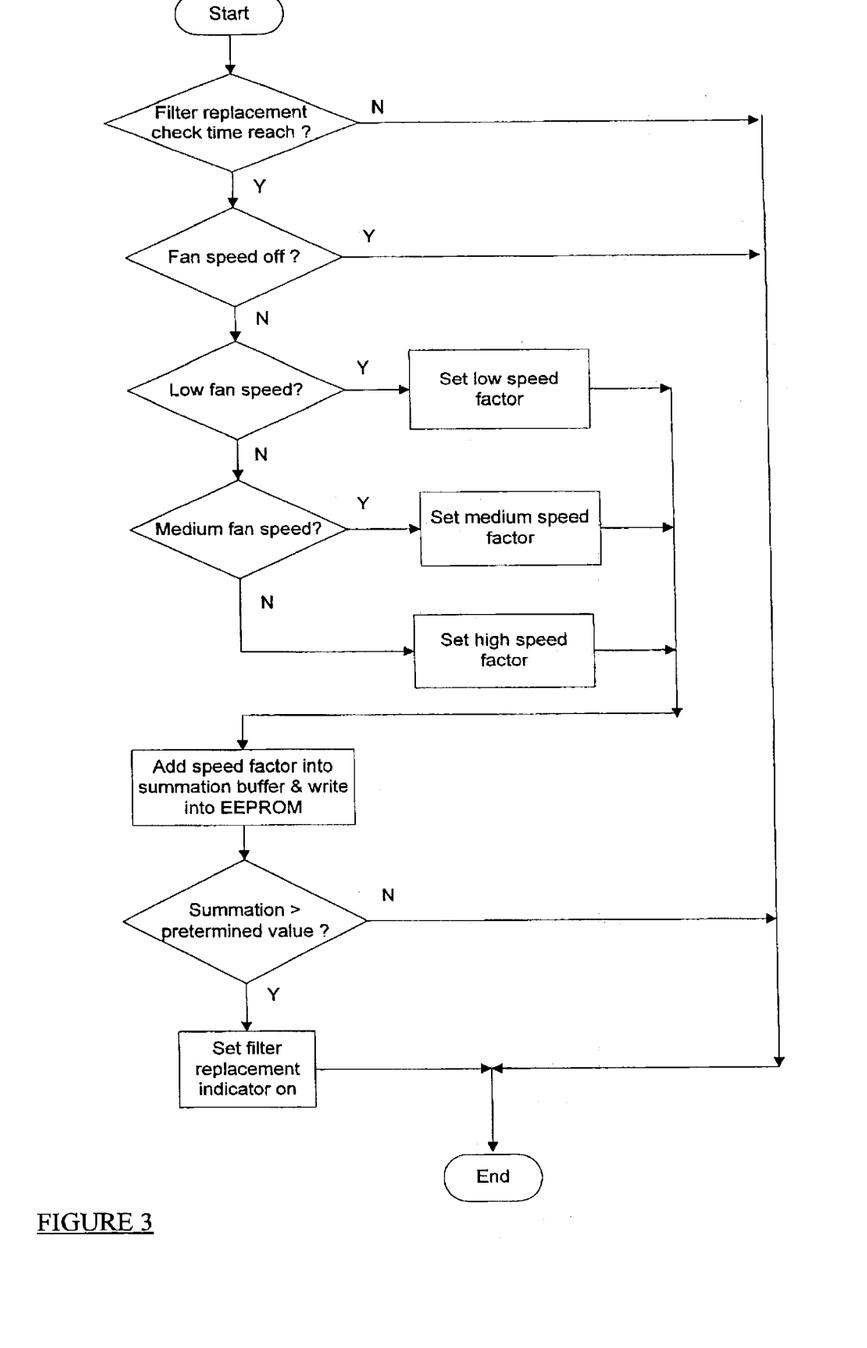
FIG. 3 is a flow chart of a filter replacement system of the air purifier.

In FIG. 3, the flow chart shows the filter replacement warning system. The filter replacement indicator 16 is initiated by the microcomputer 14 whenever the filter has been used for a predetermined total running time period. However, the predetermined total running time is adjusted automatically according to the air quality conditions during each of the running times. An "effective" total running time is automatically computed by the microprocessor according to a program based on calculations and experience. Generally stated, a filter must be replaced more often if it is used in poor air quality conditions. Thus, filtering will be satisfactory for a longer running time for a filter that is used in an environment of good air quality conditions. In practice, the air quality conditions are sometimes good and sometimes poor. Thus, the actual running time is computed and then adjusted or incremented according to the various fan speeds. When an effective total running time is computed that is equal to or more than the predetermined normal maximum useful running time for the filter, a filter replacement signal is initiated.

The effective total running time combines a relation of the fan's operating time and the fan's speed according to the formula.

$$T_{n+1}=T_n+a_i t_i$$

The total fan running time ($T_{n+1}$), which combines fan operating time ($t_i$) and speed factor ($a_i$) is recorded on EEPROM in the air purifier's control system. Every starting fan's operation or fan's speed change, the system commences to count a new operating time ($T_{n+1}$) with multiple of the fan's speed factor ($a_i$) accumulating on the previous fan's running time ($T_n$) stored in EEPROM. The fan's speed factor ($a_i$) has different values according to the fan running at different speeds (i). The speed (i) is be a factor such as Low, Median or High speed.

The new total fan running time ($T_{n+1}$) compares with the predetermined value. When the total fan running time ($T_{n+1}$) is equal to or larger than the predetermined value, the filter replacement indicator turns on to remind user to replace the filter.

Figure 4:
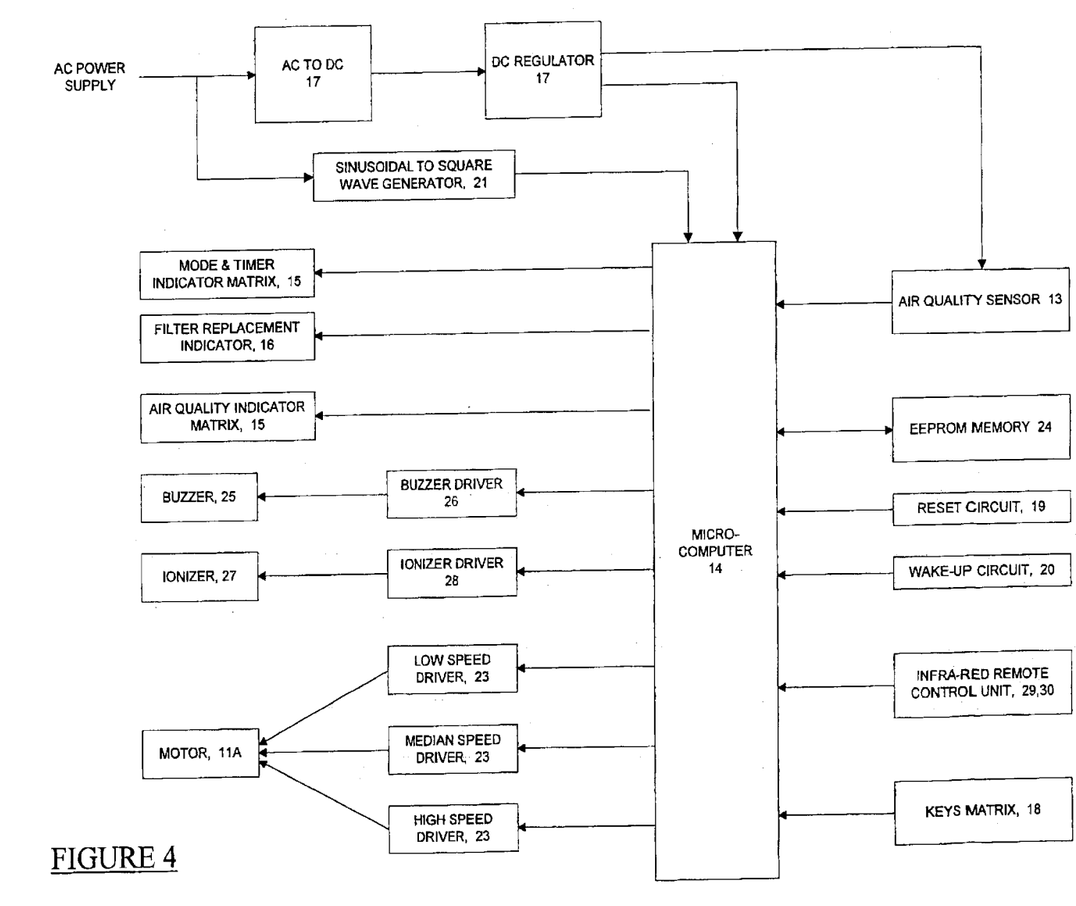
FIG. 4 is a schematic block diagram of the air purifier.
Figure 5:
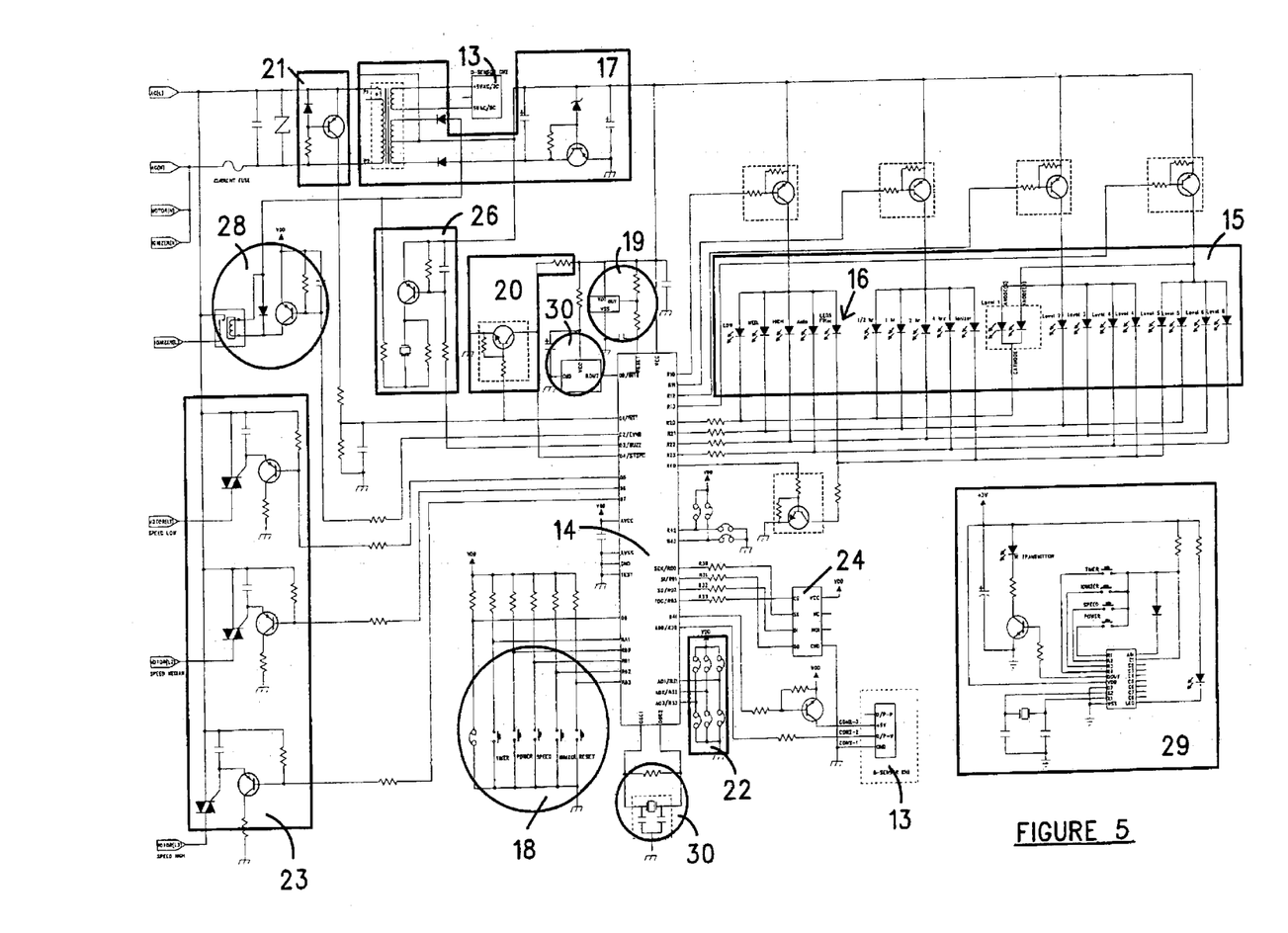
FIG. 5 is a diagram of an electrical circuit of the air purifier.

Referring to FIGS. 4 and 5, the microcomputer 14 is arranged to receive various signals, including air quality signals from the sensor 13, to control the fan motor 11A and initiate operation of other components, including a filter replacement indictor 16, as required. The reference numerals in FIGS. 4 and 5 correspond to one another.

The microcomputer 14 is supplied via rectifier, transformer and voltage regulator circuits 17 and manually controllable by operating keys 18. Visual display of air quality, mode of operation, fan speed and automatic shut-off timers are provided in a display matrix 15. A microprocessor reset circuit 19 uses a zero output of IC4. When its voltage supply falls to or is below its reset level, the microprocessor will be set. A wake-up circuit 20 retains data and operational status in the event of a mains power interruption. When the power supply is restored, a signal is supplied to a STOP C pin of the microcomputer 14. A sinusoidal to square wave generator 21 receives power from the mains supply and square waves are used for the system of the air purifier as a timing source.

In operation, the sensor 13 detects all particles in the air that are more than 1 micrometer in size, and counts the average number of particles per unit volume. The preferred unit volume is one cubic foot. The sensor 13 has an output voltage range of 0 to 4 volts which is applied to the microcomputer 14 via resistor R16. In the sensor 0 to 4 volts correspond to a range of 0 to 8000 particles per cubic foot. The microcomputer 14 converts the analogue voltage range 0 to 4 volts into seven quality conditions 0 to 6. According to the flow diagram the conditions correspond to:

Condition 0 —turn off fan
Condition 1 or 2 —run fan at low speed
Condition 3 or 4 —run fan at medium speed
Condition 5 of 6 —run fan at High speed.

The microcomputer also provides a digital output to provide a six bar visual indicator or in the matrix 15. Thus, the described purifier provides a visual indication of the air quality condition at all times.

It is normally necessary to adjust the indicated conditions against absolute conditions for different places and environments. This adjustment is made by selection of appropriate jump wires provided in the circuit arrangement at 22.

According to the output of the sensor 13, the microcomputer is arranged to intermittently at predetermined intervals adjust or alter the speed of the fan by controlling the motor 11A. For this purpose three triac power supplies 23 are selectively used. At an air quality condition equal to 0, the room air quality is regarded as good (or relatively clean) so the fan is turned OFF. This means the motor 11A will not run (unless a manual override is used), or the motor will stop during an ON period as soon as the "0" condition is reached. The "0"condition indicates 0 to 2200 particles per unit volume (one cubic foot) of air. At air quality condition 1 and 2, the microcomputer will cause the fan to be run at low speed, at condition 3 and 4 at median speed and at condition 5 and 6 at high speed. Such control and alteration of speed takes place automatically at timed intervals and as the air quality condition changes. Thus, the microcomputer 14 is programmed to arrange to alter the speed of the fan in accordance with the air quality condition, increasing the fan speed if the air quality condition deteriorates for example.

In order to determine when to change the filter 12, a computation of running time and air quality conditions is required. This is carried out by an EEPROM memory 24. The memory 24 is supplied with fan speed data via the microcomputer as well as fan running time information. The fan speed is determined or controlled according to the air quality condition and so "fan speed" data is equivalent to air quality condition data. When a predetermined computed total running time for a filter change is completed, the memory 24 provides a signal to the microcomputer 14 that is used to initiate the filter replacement indicator matrix 16 as required. In FIG. 3, this indicator is shown at 15, being LED 5.

The air purifier also includes a buzzer 25 and buzzer drive circuit 26, and an ioniser 27 and ioniser drive circuit 28. Such devices are well-known in air purifiers already, as is an infra-red remote controller 29 and an infra-red signals receiver unit 30 shown in the Figures.

We claim:

1. An air purifier comprising:
   a cabinet,
   a replaceable filter mounted in the cabinet,
   an electrically driven fan arranged to draw air through the filter,
   an air quality sensor arranged to detect particles in the air, and
   a programmed microcomputer arranged to alter the speed of the fan in accordance with signals generated by the air quality sensor in a manner such that the fan speed is increased when the air quality condition is poor or deteriorates, the fan speed is decreased when the air quality condition is good or improves, and the fan is automatically turned off whenever the number of particles per cubic foot of air is in the range 0 to 2200.

2. An air purifier as claimed in claim 1 wherein the air quality sensor is arranged to detect particles equal to or larger than one micrometer in size, and the microcomputer is arranged to turn off the fan automatically whenever the number of said particles per cubic foot of air is in the range of 0 to 2200.

3. An air purifier comprising:
   a cabinet,
   a replaceable filter mounted in the cabinet, an electrically driven fan arranged to draw air through the filter, an air quality sensor arranged to detect particles in the air, a visual display arranged to provide a visual display indicative of air quality, and a programmed microcomputer responsive to signals from the air quality sensor to cause the visual display to indicate air quality, and to alter the speed of the fan in accordance with the indicated air quality in a manner such that the fan speed is increased when the air quality condition is poor or deteriorates, the fan speed is decreased when the air quality condition is good or improves, and the fan is automatically turned off whenever the number of particles per cubic foot of air is in the range of 0 to 2200.

4. An air purifier comprising:

a cabinet, a replaceable filter mounted in the cabinet, an electrically driven fan arranged to draw air through the filter, an air quality sensor arranged to detect particles in the air, a visual display arranged to provide a visual indication when the filter should be replaced, and a programmed microcomputer arranged to alter the speed of the fan in accordance with signals generated by the air quality sensor and to cause the visual display to indicate that the filter should be replaced, said indication being caused when a fan total running time value equals or exceeds a predetermined value, the fan total running time value being incremented according to the formula $T_{n+1} = T_n + a \times t$, wherein $T_n$ is the fan total running time, a is a fan speed factor and t is the fan operating time at speed factor a.

5. An air purifier as claimed in claim 4 wherein the fan total running time value is incremented each time the microcomputer changes the fan speed.

* * * * *